United States Patent
Herzl

[11] 4,083,241
[45] Apr. 11, 1978

[54] MULTI-CHANNEL COMMON-LINE FLOWMETER TRANSMISSION SYSTEM

[75] Inventor: Peter J. Herzl, Morrisville, Pa.

[73] Assignee: Fischer & Porter Co., Warminster, Pa.

[21] Appl. No.: 776,913

[22] Filed: Mar. 11, 1977

Related U.S. Application Data

[63] Continuation-in-part of Ser. No. 768,414, Feb. 14, 1977.

[51] Int. Cl.² ............................................. G01F 1/32
[52] U.S. Cl. ................................. 73/194 VS; 340/184; 340/207 R
[58] Field of Search ................ 73/194 VS; 340/184, 340/207 R, 209

[56] References Cited

U.S. PATENT DOCUMENTS

| | | | |
|---|---|---|---|
| 2,103,741 | 12/1937 | Bencowitz | 340/207 X |
| 2,555,355 | 6/1951 | MacGeorge | 340/184 X |
| 2,809,520 | 10/1954 | Richard, Jr. | 73/194 X |
| 3,122,707 | 2/1964 | Godbey | 340/184 X |
| 3,455,162 | 7/1969 | Michener et al. | 73/231 |
| 3,698,245 | 10/1972 | McNabb | 73/194 |

*Primary Examiner*—Herbert Goldstein

[57] ABSTRACT

A multi-channel, common-line transmission system linking a plurality of flowmeter primaries installed at different points in a process to a remote receiving station. Each primary includes a flowmeter adapted to measure the flow rate of fluid passing through the flow conduit in which it is interposed by generating physical variations as a function of flow rate, these variations being sensed by a resonator element included in a channel oscillator whose carrier is modulated accordingly. The channel oscillators of the flowmeter primaries are assigned different frequencies within a predetermined spectrum. The modulated-carrier signals from the channel oscillators are fed over the common line to the remote station where each signal is demodulated.

4 Claims, 2 Drawing Figures

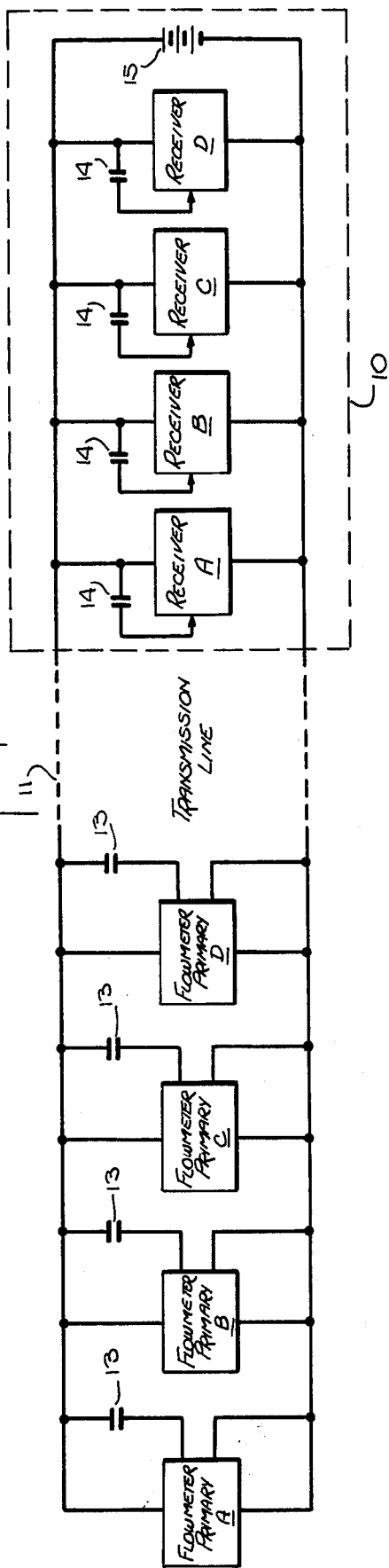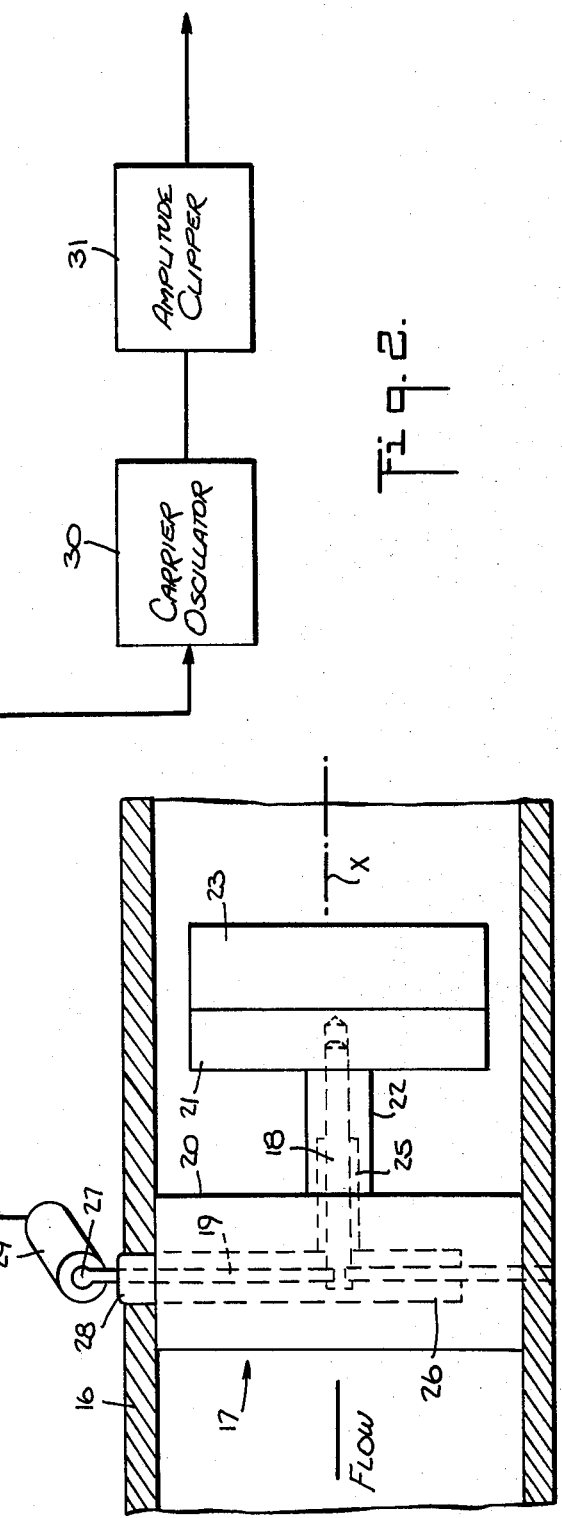

MULTI-CHANNEL COMMON-LINE FLOWMETER TRANSMISSION SYSTEM

RELATED APPLICATION

This application is a continuation-in-part of a copending application entitled "Improved Sensing System for Vortex-Type Flowmeters," Ser. No. 768,414, filed Feb. 14, 1977.

BACKGROUND OF INVENTION

This invention relates generally to the transmission of flowmeter signals to a remote station, and more particularly to a multi-channel transmission system in which a plurality of flowmeters are coupled by a common two-wire line to a remote station, the line concurrently serving to carry operating power from the station to the respective flowmeters and to convey the respective signals from the flowmeters to the station.

In many industrial processes, use is made of several flowmeters at various points in the process, each flowmeter acting to measure the flow rate of fluid passing through the line in which it is interposed. The output signals from the various flowmeters are conveyed over a suitable line to a central control room or station where the signals are recorded or applied to process control equipment.

Vortex-type flowmeters suitable for this purpose are disclosed in the Herzl U.S. Pat. No. 4,015,472 and the Richardson U.S. Pat. No. 3,948,098. In these patents, use is made of a piezo-electric sensor actuated by the vortex-pressure pulses to produce a signal whose frequency is a function of flow rate. This signal is converted into a varying current and fed over a two-wire line to a remote receiving station containing a D-C power supply and a current-sensing element connected in series with each other and with the transmission line to produce a varying output in a useful range (4 to 20 mAdc) which is an index to the flow rate. Thus the same two-wire line acts to supply operating power from the remote station to the flowmeter and to conduct the current signal from the flowmeter to the station.

With the rising cost and scarcity of skilled labor, it often becomes more expensive to install flowmeter transmission systems of the above-described type than to pay for the equipment itself. A good part of the installation cost is given over to the cost of running wires from the flowmeter primary to the remote control station. These costs are particularly high in hostile environments where the wires must be run through protective conduits, the costs in this instance running from one dollar to several dollars per foot. If, therefore, the system in a given plant makes use of, say, twenty flowmeters all linked to a central control station, the installation costs of the total system are far in excess of the equipment costs.

There are two well-known transmission techniques that would make it possible to convey signals from the several flowmeters to a remote station over a common wire line. The first technique is frequency-division multiplex (FDM) and the other time-division multiplex (TDM). In an FDM system, the transmitting terminal gives each flowmeter signal a particular frequency assignment, each flowmeter channel being assigned to a unique part of the frequency spectrum. The modulation may be amplitude-modulation, single or double-sideband modulation or frequency-modulation. In the TDM system, each flowmeter signal is sampled in sequence and a signal is transmitted describing the value of the sample. Most systems of this type use pulse-code modulation in which the value of each sample is translated into a numerical code (i.e., seven or eight binary digits).

The practical objection to a conventional FDM or TDM transmission technique for use in conjunction with a plurality of flowmeters each yielding a signal whose frequency is a function of flow rate is that the flowmeter signals, before they can be transmitted over the common line to the control station, must be converted into a form appropriate to the system. Thus in the case of an FDM system, each flowmeter signal would have to be fed to a transmitting terminal to modulate an assigned channel carrier therein.

Hence while standard wire line and carrier transmission systems can do away with the need for separate lines between the flowmeters and the central control station, the resultant savings in line installation costs are to a substantial degree offset by the cost and complexity of the transmitting terminal equipment. Moreover, while in such transmission systems the signals from the various flowmeters are conveyed over a common line, separate wiring is required to supply operating power to each flowmeter primary.

SUMMARY OF THE INVENTION

In view of the foregoing, it is the main object of this invention to provide a multi-channel, common-line transmission system for conveying the signals from a plurality of individual flowmeter primaries to a remote receiving station without the need for a transmitting terminal.

A significant advantage of a system in accordance with the invention is that it sharply reduces the cost of installing flowmeters at various points in a process and linking these meters to a control station, which cost reduction is not offset by terminal equipment costs; for though the flowmeter primary outputs are directly fed into the transmission line, there is no interference therebetween.

Also an object of the invention is to provide a common line transmission system of the above-type in which the line is composed of only two wires which function not only to convey the signals from the flowmeter primaries to the remote station but also act to carry D-C operating power from the station to the primaries.

Briefly stated, these objects are attained in a system in which a plurality of flowmeter primaries interposed in fluid conduits at various points in a process are linked by a common line to a remote receiving station, each flowmeter generating physical fluctuations as a function of flow rate.

These physical fluctuations are sensed by a resonator element included in a channel oscillator whose carrier is modulated accordingly, whereby the flowmeter yields a carrier-modulated signal whose modulation component is indicative of the metered flow rate. The channel oscillators in the plurality of primaries are given particular frequency assignments within a predetermined frequency spectrum, with sufficient separation therebetween to avoid interference between adjacent modulation components.

The carrier-modulated signals from all of the primaries are applied to a common line leading to the remote station which includes a like number of channel receivers tuned to the oscillator carrier frequencies to derive the modulation components therefrom, or a single receiver selectively tunable to pick up any desired flowmeter signal.

OUTLINE OF DRAWINGS

For a better understanding of the invention as well as other objects and further features thereof, reference is made to the following detailed description to be read in conjunction with the accompanying drawings, wherein:

FIG. 1 is a block diagram of a multi-channel flowmeter transmission system according to the invention; and FIG. 2 shows schematically a preferred form of flowmeter primary usable in the system.

DESCRIPTION OF INVENTION

The General System

Referring now to FIG. 1, there is shown a system in accordance with the invention for transmitting to a remote receiving station 10 the signals yielded by a plurality of identical flowmeter primaries A, B, C and D interposed at various points in a process by means of a two-wire transmission line 11 and 12. While only four flowmeter primaries are shown, in practice many more may be used.

Each flowmeter primary includes a flowmeter generating a fluctuating physical value such as periodic fluidic pressure pulses as a function of the flow rate of the fluid being metered. These variations are detected by a sensor in the form of a resonator element which is included in a channel oscillator whose carrier is modulated accordingly. Thus each primary in the system is composed of a flowmeter whose sensor is associated with an electronic oscillator to modulate the carrier thereof as a function of flow rate.

The channel oscillators are assigned different carrier frequencies within a predetermined spectrum and with sufficient separation therebetween to avoid interference between the modulation component of the flowmeter signals. Thus in the case of amplitude-modulation, the channel separation need not be as great as with frequency-modulation. The system is operable with either type of modulation.

The modulated carrier signals yielded by the oscillators of primaries A, B, C and D are applied to the two-wire line through D-C blocking capacitors 13. At the remote station 10, the incoming signals are picked up through blocking capacitors 14 by receivers A, B, C and D which are respectively tuned to the carrier frequencies of the correspondingly-lettered primaries and serve to extract the modulation components therefrom. The demodulated signals which represent the metered flow rates may then be applied to indicators or converted into varying currents in a useful range (4 to 20 mAdc) for use in automatic process control applications.

In practice, a single multi-channel receiver may be used, the receiver being tunable to any of the channels to pick-up any desired primary output. Thus the readings from the primaries are obtained, in this instance, in sequence.

The nature of the receiver depends, of course, on the type of carrier modulation employed in the primaries. Thus in the case of FM modulation, the receiver will include a conventional FM discriminator. The D-C voltage for powering all of the receivers and all of the primaries is furnished by a D-C source 15 which is connected to the transmission line 11, 12 across which all operating elements of the system are shunted.

In this way, the two-wire line 11 and 12 conducts D-C power from the remote station 10 to the various flowmeter primaries, and it also conveys the AC signals from the primaries to the receivers. While there are obvious advantages in using a two-wire transmission line, the invention is not limited thereto and in some instances one may prefer to segregate DC power from the AC signals and for this purpose make use of a three-wire line, one line being common, the second being used for DC transmission and the third for signal transmission.

The Flowmeter Primaries

These primaries (A, B, C and D) are of the type more fully disclosed in applicant's copending application entitled "Improved Sensing System for Vortex-Type Flowmeters", Ser. No. 768,414, filed Feb. 14, 1977. whose entire disclosure is incorporated herein by reference. Such primaries make use of a flowmeter in conjunction with a carrier oscillator and while the invention is not limited to flowmeters of the vortex-type, it will be described herein in connection with such meters.

In a vortex-type flowmeter of the type shown in FIG. 2, the fluid to be metered is conducted through a flow tube 16 interposed in a fluid line. For this purpose, flow tube 16 may be provided with mounting flanges to facilitate coupling to the end flanges of the upstream and downstream line pipes.

Mounted within flow tube 16 is an obstacle assembly generally designated by numeral 17, the assembly including a deflectable section which is responsive to the Karman Vortex street and is caused to vibrate microscopically at a frequency which is proportional to flow rate. Incorporated in the obstacle assembly is a vibration transmitter composed of a rod 18 and a probe 19.

Flow tube 16 is shown as having a circular cross-section; but it may, in other cross-sectional forms, include an inlet into which the fluid to be metered is introduced. The flow impinges on obstacle assembly 17 which acts to divide the flow around the obstacle, producing fluidic perturbations in the form of a Karman Vortex. The nature of this phenomenon is explained in the text by Schlichtling "Boundary Layer Theory" (McGraw-Hill 1960).

Obstacle assembly 17 is constituted by a transversely-mounted front section 20 and a rear section 21 mounted behind the front section by a cantilever support in the form of a flexible web 22. Extending downstream from rear section 21 is a tail 23. Front section 20 is a contoured block having a triangular or delta-shaped cross-section which is uniform throughout the long axis of the block, this axis being perpendicular to the flow axis X of the flow tube. The extremities of the front section are secured to the wall of the tube whereby the front section is held fixedly within the tube. The apex of block 20 faces the incoming fluid, the inclined sides thereof forming leading edges which are swept by the fluid flow to create vortices.

Rear section 21 takes the form of a non-streamlined body having a rectangular cross-section which is maintained by web 22 in spaced relation to the front section, the plane of the rear section being parallel to the flat base of the front section. The rear section shape is such as to interfere with the vortex street, and the gap established between the front section block and the rear section tends to trap the vortices and to strengthen and stabilize the vortex street produced thereby.

Because rear section 21 is cantilevered by means of flexible web 22, it is deflectable. The web, though bendable, has sufficient rigidity so as to permit only a slight deflection of the rear section. As a consequence of the fluidic oscillations produced within the flow tube, the deflectable rear section is excited into vibration at a rate corresponding to the frequency of the oscillations.

Because the deflectable system is relatively rigid, the total excursion of the rear section is minute even at the highest amplitudes of fluidic oscillation, so that metal fatigue of the supporting web, as a result of the vibrating action, is minimized and failures do not arise after prolonged operation.

The minute vibrations of the deflectable rear section of the obstacle assembly are sensed outside of flow tube 16. For this purpose, the vibrations are transmitted by rod 12 whose rear portion is socketed within a bore 24 which extends in a path coincident with flow tube axis X from a point about midway in web 22 to a point near the junction of rear section 21 and tail 23. The front portion of rod 18 lies freely within a relatively large diameter bore 25 communicating with the smaller diameter bore 24 and extending well into front section 20.

The vibrating motion of the rod is transferred to the exterior of the flow by probe 19 which is formed of spring material, one end of the probe being anchored in the wall of the flow tube. Probe 19 extends through an internal bore 26 formed in non-deflectable front section 20 along an axis at right angles to tube axis X, the bore registering with a small opening in the wall of the flow tube. The free end of probe 19 protrudes through the wall opening and terminates in a coupling head 27. The opening in the flow tube is sealed by a rubber diaphragm 28. When coupling head 27 is depressed by an external sensor 29, the vibrations of rod 18 are transferred by probe 19 to external sensor 29.

Any sensor capable of responding to a vibratory action to produce a corresponding electrical signal may be used in conjunction with the coupling head 27 of the probe. A preferred sensor for this purpose is a quartz piezoelectric load cell, such as the "Piezotron" load cell (922 series) manufactured by Kistler Instrument Company of Redmond, Washington. This is a very stiff, rugged force sensor responsive to minute incremental forces and usable in environments contaminated by dust, dirt or moisture without any adverse effect on signal transmission.

Crystal sensor 29 acts as the frequency-determining element or resonator of a high-frequency carrier oscillator 30 such as a crystal-controlled oscillator of the type now used in electronic watches and operating at a frequency above 30,000 Hz to provide a time base. A typical crystal-controlled oscillator of this type is disclosed in the Roberts U.S. Pat. No. 3,803,827 entitled "SOLID STATE ELECTRONIC WATCH."

When piezo-electric crystal sensor 29 is de-coupled from coupling head 27, the oscillator generates its normal output frequency, say, a carrier of 40,000 Hz. But when sensor 25 is pressed against coupling head 27, it is stressed thereby at the vibratory frequency of the flowmeter vortices which are transferred thereto by the mechanical transmission system formed by elements 18 and 19.

As a consequence, the resonance frequency of the crystal is frequency-modulated (i.e., shifted on either side of the 40,000 Hz carrier frequency) by the vibratory frequency of the flowmeter to yield a frequency-modulated carrier signal from oscillator 30. Concurrently, the amplitude of the carrier signal is amplitude-modulated in accordance with the vibratory rate.

In the arrangement shown in FIG. 2, only FM component of the oscillator output is exploited, the AM component being eliminated. This is accomplished by applying the output of oscillator 30 to an amplitude clipper 31 yielding a constant amplitude carrier signal which is frequency-modulated in accordance with flow rate.

In the case of an FM flowmeter primary of the type disclosed in FIG. 2, the channel receivers associated therewith make use of FM demodulators. However, since the carrier signal also contains an amplitude modulation component, one may disregard the FM component and make use of amplitude-modulation diode detectors.

While there have been shown and described preferred embodiments of multi-channel transmission systems of flowmeter primaries in accordance with the invention, it will be appreciated that many changes and modifications may be made therein without, however, departing from the essential spirit thereof. Thus the invention is by no means limited to crystal sensors, and, as explained in the above-identified copending application, inductive and other types of sensors may be used to modulate the oscillator frequencies.

I claim:

1. A multi-channel, common-line transmission system for transmitting flowmeter readings taken at a plurality of points to a remote station, said system comprising:
   A. a plurality of d-c powered primaries at each point, each primary being constituted by a vortex flowmeter that measures the flow rate of fluid generating periodic fluidic fluctuations as a function thereof, a sensor responsive to said fluctuations, said sensor being an inductive resonator element whose reactance is varied by said fluctuations, a channel oscillator which incorporates said resonator element to produce a carrier whose amplitude and frequency are modulated by said resonator element whereby the resultant carrier signal is modulated as a function of flow rate, and means to maintain the amplitude of said modulated carrier constant to produce a frequency-modulated carrier signal, the oscillators in said plurality of primaries being assigned distinct channel positions within a predetermined frequency spectrum;
   B. a common two-wire transmission line extending between said primaries and said remote station to convey the frequency-modulated carrier signals in said spectrum from the primaries to said station; and
   C. frequency-modulation receiver means at said station to demodulate said carrier signals to derive therefrom signals indicative of the flow rate at the respective points, said station having a d-c power source connected to said line to supply operating power to the primaries.

2. A system as set forth in claim 1, wherein each carrier signal is applied to said line through a d-c blocking capacitor.

3. A system as set forth in claim 1, wherein said receiver means is constituted by a multi-channel receiver tunable to any one of the channels to provide the signal from a selected channel.

4. A system as set forth in claim 1, wherein said receiver means is constituted by a like plurality of receivers each tuned to a respective channel.

* * * * *